(12) United States Patent
Sasaki et al.

(10) Patent No.: US 9,109,953 B2
(45) Date of Patent: Aug. 18, 2015

(54) PHOTODETECTOR AND COMPUTED TOMOGRAPHY APPARATUS

(71) Applicant: KABUSHIKI KAISHA TOSHIBA, Minato-ku, Tokyo (JP)

(72) Inventors: Keita Sasaki, Yokohama (JP); Shunsuke Kimura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/282,048

(22) Filed: May 20, 2014

(65) Prior Publication Data

US 2014/0367576 A1    Dec. 18, 2014

(30) Foreign Application Priority Data

Jun. 12, 2013 (JP) ................................. 2013-123821

(51) Int. Cl.
*G01T 1/20* (2006.01)
*G01J 1/44* (2006.01)
*G01T 1/164* (2006.01)

(52) U.S. Cl.
CPC ........ *G01J 1/44* (2013.01); *G01T 1/1647* (2013.01)

(58) Field of Classification Search
USPC .......................................................... 250/366
See application file for complete search history.

(56) References Cited

U.S. PATENT DOCUMENTS

| 3,965,358 A * | 6/1976 | Macovski ............................ 378/5 |
| 4,464,053 A * | 8/1984 | Bodlaj .............................. 356/608 |
| 4,519,092 A * | 5/1985 | Albert ................................ 378/45 |
| 4,661,909 A * | 4/1987 | Kumazawa et al. ......... 250/363.07 |
| 4,879,464 A * | 11/1989 | Iinuma ........................ 250/361 R |
| 6,194,726 B1 * | 2/2001 | Pi et al. ........................... 250/363.1 |
| 6,635,878 B2 * | 10/2003 | Bertelsen ........................ 250/369 |
| 8,395,127 B1 | 3/2013 | Frach et al. |
| 2010/0268074 A1 * | 10/2010 | Van Loef et al. ............... 600/431 |
| 2013/0009066 A1 * | 1/2013 | Grazioso et al. ......... 250/363.03 |
| 2013/0009267 A1 | 1/2013 | Henseler et al. |
| 2014/0105350 A1 * | 4/2014 | Kulik et al. ....................... 377/39 |

FOREIGN PATENT DOCUMENTS

| JP | 8-327744 | 12/1996 |
| JP | 2008-311651 | 12/2008 |
| JP | 2009-25308 | 2/2009 |

OTHER PUBLICATIONS

Extended European Search Report issued by the European Patent Office on Aug. 5, 2014, for European Patent Application No. 14170262.1.

* cited by examiner

*Primary Examiner* — Kiho Kim
*Assistant Examiner* — Taeho Jo
(74) *Attorney, Agent, or Firm* — Finnegan, Henderson, Farabow, Garrett & Dunner, L.L.P.

(57) ABSTRACT

A photodetector according to an embodiment includes: a photodetector element unit including a first cell array including a plurality of first cells arranged in an array and a second cell array including a plurality of second cells arranged in an array, each of the first and second cells including a photoelectric conversion element, the second cell array being arranged to be adjacent to the first cell array; a first pulse height analyzer unit analyzing a pulse height of an electrical signal outputted from the first cell array; a second pulse height analyzer unit analyzing a pulse height of an electrical signal outputted from the second cell array; and a signal processing unit determining non-uniformity of a distribution of photons entering the first and second cell arrays using an output signal of the first pulse height analyzer unit and an output signal of the second pulse height analyzer unit.

13 Claims, 18 Drawing Sheets

B-B SECTION

PHOTODETECTOR AND COMPUTED TOMOGRAPHY APPARATUS

CROSS REFERENCE TO RELATED APPLICATIONS

This application is based upon and claims the benefit of priority from prior Japanese Patent Application No. 2013-123821 filed on Jun. 12, 2013 in Japan, the entire contents of which are incorporated herein by reference.

FIELD

Embodiments described herein relate generally to photodetectors and computed tomography apparatuses.

BACKGROUND

A silicon photomultiplier (SiPM) is a photodetector element including two-dimensionally arranged avalanche photodiodes (hereafter referred to as "APDs"), which operate in a mode called "Geiger mode" when a reverse-bias voltage higher than a breakdown voltage of the APDs is applied thereto. The gain of an APD operating in Geiger mode is very high, $1 \times 10^5$ to $1 \times 10^6$. Therefore, a very weak light emission of a single photon can be measured using the APD.

A resistor having a high resistance value called "quenching resistor" is connected in series to each APD of a SiPM, When a single photon enters the APD to cause a Geiger discharge, the quenching resistor causes a voltage drop to terminate the amplification. As a result, a pulsed output signal can be obtained. Each APD of the SiPM acts in this manner. Accordingly, if the Geiger discharge occurs in a plurality of APDs, an output signal can be obtained, the output signal indicating a charge value or pulse height value obtained by multiplying an output signal of a single APD by the number of APDs in which Geiger discharge occurs. Therefore, the number of APDs in which the Geiger discharge occurs, i.e., the number of photons entering the SiPM, can be determined from such an output signal. This enables the counting of the number of photons.

As described above, if a plurality of photons enters the SiPM, the number of photons can be correctly counted as long as a single photon enters each APD of an APD array, since the Geiger discharge occurs in each APD. However, it takes some time for an APD in which a Geiger discharge occurs to recover to the original reverse-bias potential state. If a photon enters thereto during such a time, a sufficient reverse-bias is not applied to the APD. As a result, the photon is not counted. Therefore, the recovery time is called "dead time." If a large number of photons reach the APD array during the dead time, there would be a loss in the counting of photons. Accordingly, the output signal shows nonlinear values relative to the number of photons. As a result, the photon counting accuracy is considerably degraded.

The spatial distribution and temporal distribution of the photons entering the SiPM greatly relate to the cause of such a degradation. For example, cases where light rays having the same energy enter the SiPM uniformly and non-uniformly are considered. If the light rays enter non-uniformly, a frequency with which a single APD receives a light ray during a short period increases. Accordingly, the output signal in such a case becomes lower than that in the case where the light rays enter uniformly. However, the APDs of the SiPM are connected in parallel, and there is no information on which APDs are in the Geiger mode at which timing. Therefore, such an output signal, which is an erroneous signal having information that a lower number than the actual number of photons enter, the energy resolution of the SiPM is degraded.

In order to improve the characteristics of SiPMs, the number of APD arrays for receiving photons is increased, or the dead time is shortened in some SiPMs. However, if the number of APD arrays is increased, the area of each APD may be reduced. This would degrade the photon detection efficiency and the gain. The shortening of dead time is in a trade-off with an increase of noise or a decrease of gain. Accordingly, this cannot solve the problem fundamentally.

DETAILED DESCRIPTION

A photodetector according to an embodiment includes: a photodetector element unit including a first cell array in which a plurality of first cells are arranged in an array, each of the first cells including a photoelectric conversion element that detects a photon incident thereto and converts the photon to an electrical signal, and a second cell array in which a plurality of second cells are arranged in an array, each of the second cells including a photoelectric conversion element that detects a photon incident thereto and converts the photon to an electrical signal, the second cell array being arranged to be adjacent to the first cell array; a first pulse height analyzer unit that analyzes a pulse height of an electrical signal outputted from the first cell array; a second pulse height analyzer unit that analyzes a pulse height of an electrical signal outputted from the second cell array; and a signal processing unit that determines non-uniformity of a distribution of photons entering the first cell array and the second cell array using an output signal of the first pulse height analyzer unit and an output signal of the second pulse height analyzer unit.

Embodiments will now be explained with reference to the accompanying drawings.

(First Embodiment)

Figure 1:
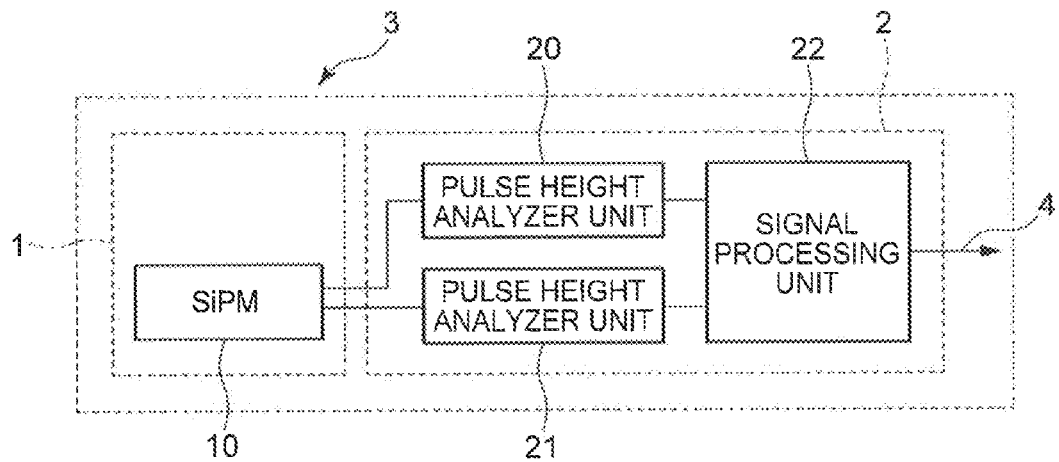
FIG. 1 is a block diagram showing a photodetector according to the first embodiment.

FIG. 1 is a block diagram showing the structure of a photodetector 3 according to the first embodiment. The photodetector 3 includes a photodetector element 1 for detecting photons to be counted and converted to electrical signals, and a signal processing circuit 2 for processing the electrical signals photoelectrically converted by the photodetector element 1. The photodetector element 1 includes a silicon photornultiplier (SiPM) 10 serving as a photoelectrically converting device. The signal processing circuit 2 includes pulse height analyzer units 20 and 21 for analog-to-digital converting analog electrical signals outputted from the SiPM 10, and a signal processing unit 22 for processing the digital signals from the pulse height analyzer units 20 and 21. The signal processing circuit 2 also includes circuits relating to the driving and the characteristics of the photodetector such as a voltage power supply circuit and a temperature compensation and control circuit, which are not shown for the simplicity of the descriptions of the first embodiment. Although the pulse height analyzer units 20 and 21 are described to be included in the signal processing circuit 2, they can be formed as an on-chip circuit on a common chip together with the SiPM 10 formed on a semiconductor substrate. Output signals 4, which are subjected to the analog-to-digital signal processing performed by the signal processing unit 22, are transferred to an information terminal such as a personal computer via a USB cable, for example.

Next, the specific structure and operation of the photodetector 3 according to the first embodiment will be described.

Figure 2:
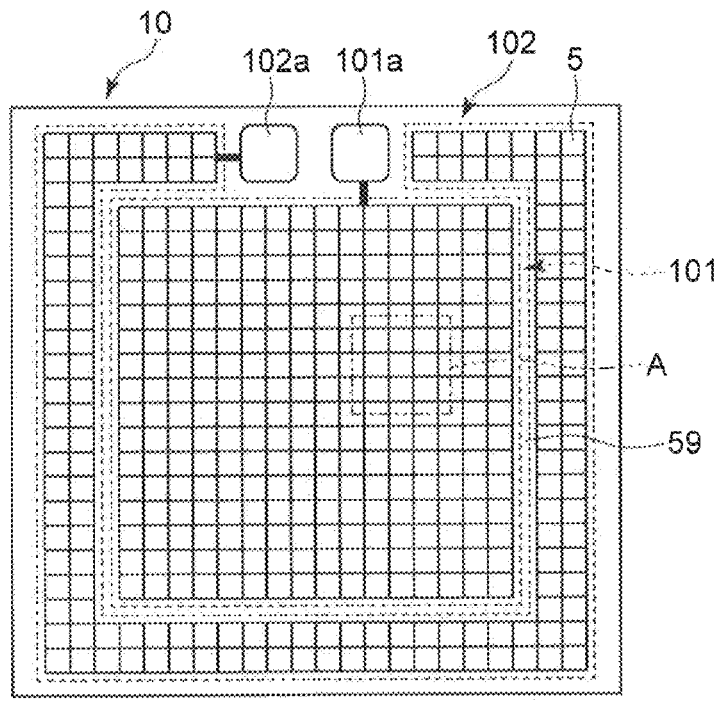
FIG. 2 is a plan view showing a first example of a SiPM included in the first embodiment.

FIG. 2 is a plan view of the SiPM 10 according to the first embodiment. The SiPM 10 includes two arrays, a first APD cell array 101 and a second APO cell array 102, in which APD cells 5 performing photoelectric conversion are two-dimensionally arranged. The first APD cell array 101 and the second APD cell array 102 are electrically isolated from each other by an element isolation region 59.

In each APD cell array 101, 102, the APD cells 5 are connected in parallel with each other. The first APD cell array 101 is connected to an electrode 101a and the second APD cell array 102 is connected to an electrode 102a.

Figure 3:
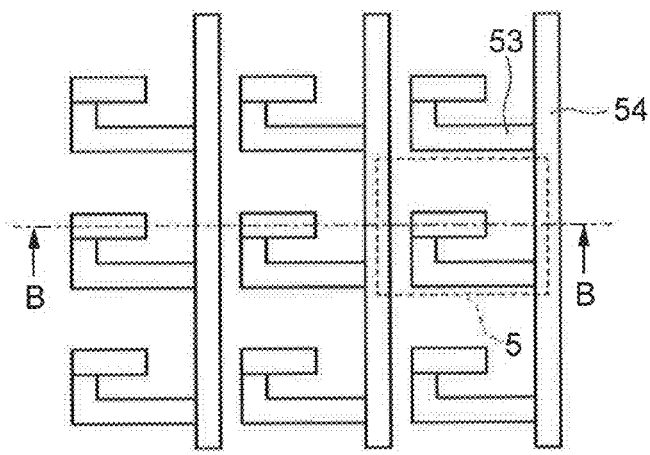
FIG. 3 is a plan view showing an APD cell array including 3×3 APD cells, which is an enlarged view of a region A of the SiPM shown in FIG. 2.
Figure 4:
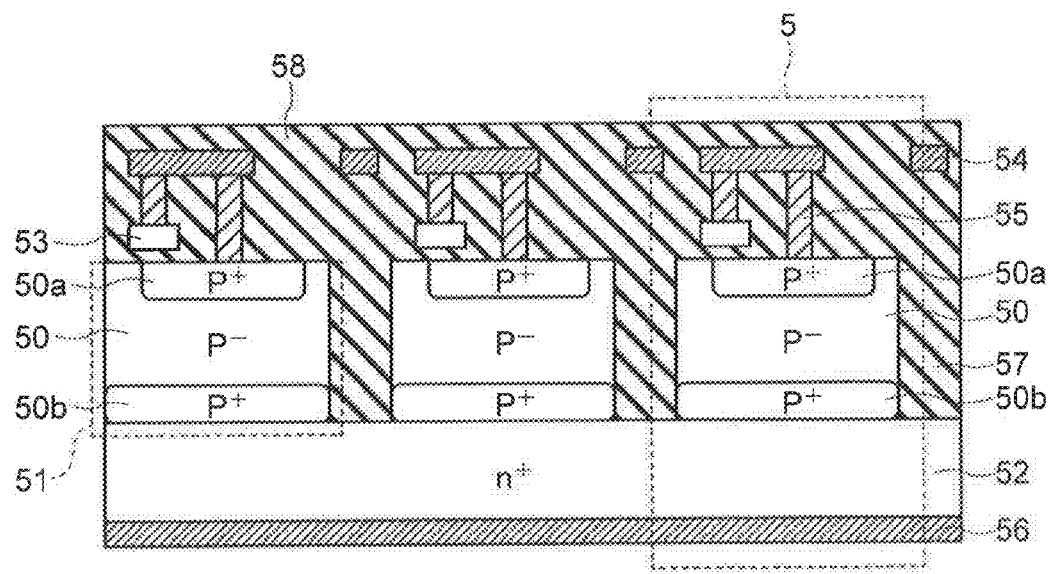
FIG. 4 is a cross-sectional view of the SiPM shown in FIG. 3, taken along line B-B.

FIG. 3 is a plan view of an APD cell array including 3×3 APD cells, which is an enlarged view of the region A shown in FIG. 2. FIG. 4 is a cross-sectional view showing the SiPM 10 cut by a line B-B shown in FIG. 3. Each APD cell 5 includes a p-type epitaxial layer 50 epitaxially grown on an $n^+$ type semiconductor substrate 52. The p-type epitaxial layer 50 is isolated by an element isolation region 57 formed of an insulating film. The p-type epitaxial layer 50 is a $p^-$ layer with a low impurity concentration. By implanting an acceptor impurity into the p-type epitaxial layer 50, $p^+$ layers 50a, 50b are formed. The p-type epitaxial layer 50 and the $p^+$ layers 50a, 50b make an avalanche layer 51.

In order to obtain electric charges generated by the avalanche layer 51, a contact 55, a quenching resistor 53, and a signal wiring line 54 connecting to the $p^+$ layer 50a are formed. The contact 55, the quenching resistor 53, and the signal wiring line 54 are covered by an interlayer insulating film 58.

A metal electrode 56 is formed at the back side of the semiconductor substrate 52 by sputtering or plating. The planar layout shown in FIG. 3 is only an example for briefly explaining the SiPM, and is not limited to FIG. 3. Furthermore, although FIG. 4 shows a vertical APD cell structure in which the p-type epitaxial layer 50 is formed on the $n^+$-type semiconductor substrate 52 and an acceptor impurity is implanted thereto, another type of vertical structure in which the internal impurity concentration distribution differs, or a lateral APD cell structure may also be employed.

Figure 5:
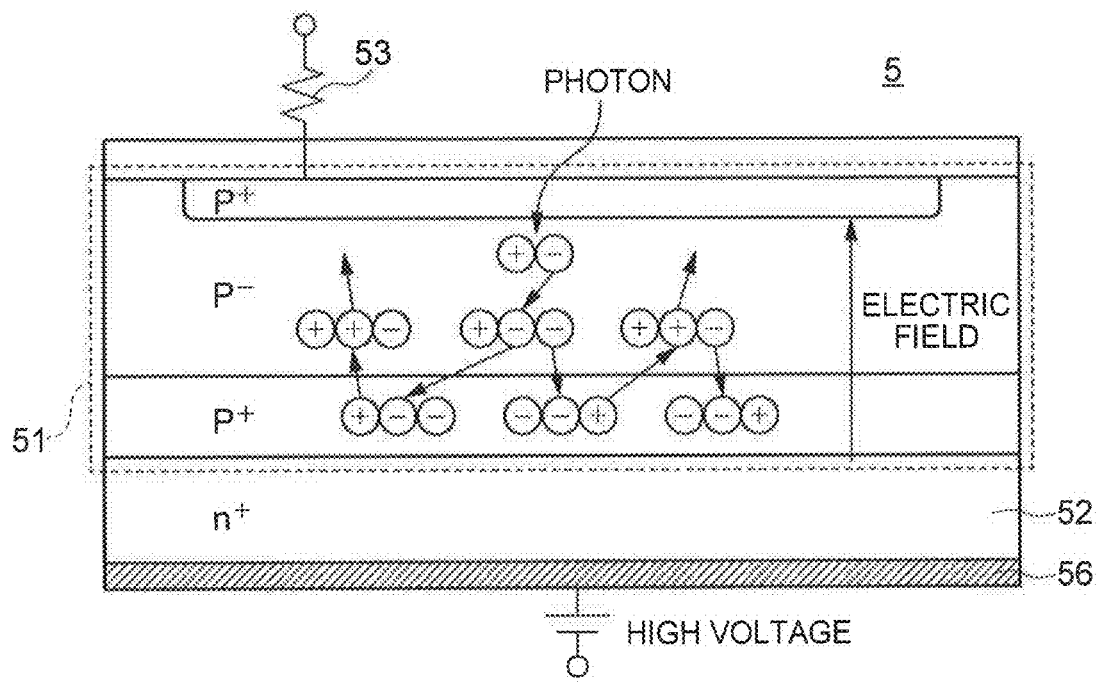
FIG. 5 is a cross-sectional view of a Geiger mode APD cell for explaining the operational principle of the SiPM according to the first embodiment.

Next, the operational principle of the SiPM 10 will be described with reference to FIGS. 5 and 6. FIG. 5 is a cross-sectional view of a Geiger mode APD cell 5 for explaining the operational principle of the SiPM 10. The cross-sectional structure of the APD cell 5 shown in FIG. 5 is the same as that in FIG. 4. This APD cell 5 has a vertical structure in which a p-type epitaxial layer 50 is formed on the $n^+$-type semiconductor substrate 52 and an acceptor impurity is implanted thereto. Therefore, the metal electrode 56 serves as a cathode electrode, and when a reverse-bias voltage is applied to the metal electrode 56, an electric field is generated in the avalanche layer 51. If the reverse-bias voltage is increased further, the electric field intensity is increased to cause avalanche breakdown at a certain reverse-bias voltage to allow a large current to flow. Such an APD that is activated by applying thereto a voltage more than the breakdown voltage for causing avalanche breakdown is called a Geiger mode APD.

In order for a Geiger mode APD to cause avalanche breakdown, electrons or holes serving as seeds are required in a depletion layer region to which a high electric field is applied. If photons are absorbed in this region to cause photoelectric conversion to generate electron-hole pairs, avalanche breakdown is caused to allow a large current to flow continuously. In order to prevent this, the quenching resistor 53 is connected in series on the anode side, from which the charges are obtained. Since the quenching resistor 53 is connected in series, a voltage drop occurs at the same time as the avalanche breakdown occurs to allow a large current to flow. Accordingly, the potential between the anode and the cathode falls to the breakdown voltage to terminate the multiplication function of the avalanche layer 51. As a result, the output signal becomes a pulsed signal. Since a single photon makes such a pulsed signal, a photon counting can be performed.

Figure 6:
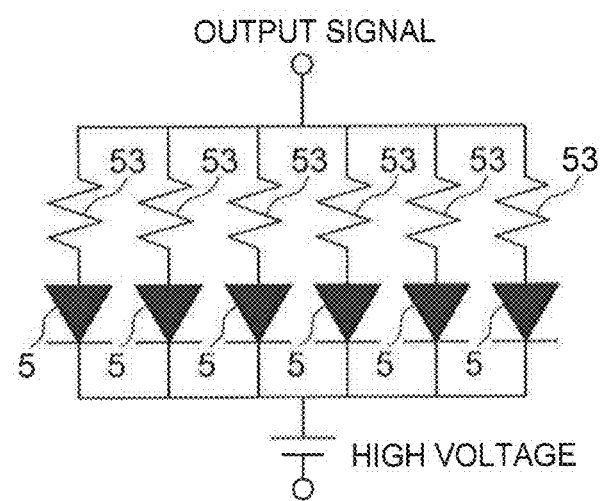
FIG. 6 is an equivalent circuit diagram of the SiPM according to the first embodiment, for explaining the operational principle of the SiPM.

FIG. 6 is an equivalent circuit diagram of the SiPM 10. In the equivalent circuit, a plurality of APD cells 5, each connected to a quenching resistor 53 located on the anode side, is connected in parallel. As has been described with reference to FIG. 5, each APD cell 5 is capable of detecting a single photon. Accordingly, each of the APD cells 5 connected in parallel detects a photon, and thus the limit value of the number of photons that can be detected is determined by the number of APD cells 5 in the SiPM 10.

As described above, photon counting can be performed by using the APD cells 5 operating in Geiger mode. However, it requires a recovery time to recover the potential, which has decreased to the breakdown voltage, to the Geiger mode operating potential to enable the photon detection again, the recovery time being in accordance with an RC time constant determined by the capacity of the APD cell 5 and the quenching resistor 53. If a photon enters the APD cell 5 during the recovery time, the multiplication function cannot be satisfactorily obtained to have an output signal. For this reason, the recovery time is also called "dead time." Similarly, the output signal does not change if a photon enters during the avalanche breakdown time. Thus, depending on the state of the SiPM 10, omission in counting occurs, which reduces the photon counting accuracy. A specific example of such a case will be described as a comparative example.

Figure 7:
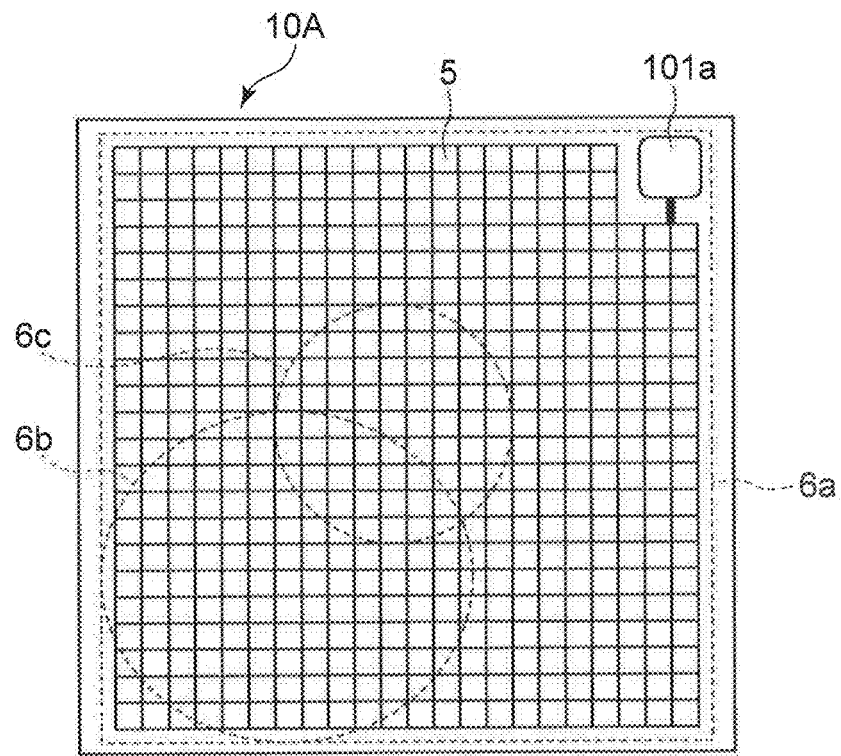
FIG. 7 is a plan view of a SiPM according to a comparative example.
Figure 8:
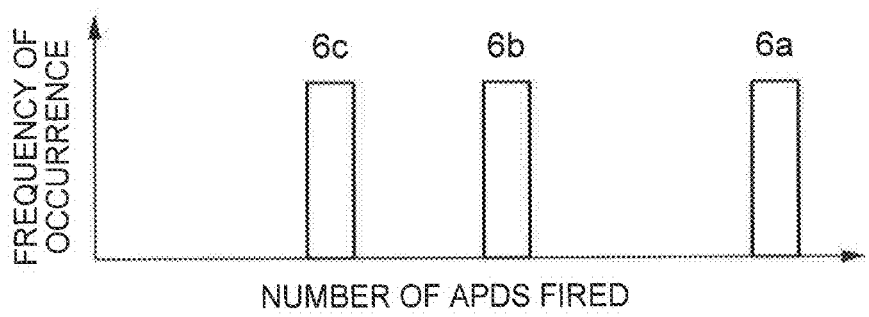
FIG. 8 is a histogram showing outputs from the SiPM according to the comparative example.

FIG. 7 is a plan view of a SiPM 10A according to a comparative example. The SiPM 10A of the comparative example includes two-dimensionally-arranged APD cells 5 that are connected in parallel with each other and further connected to an electrode 101a of an APD cell array. Cases of three photon receiving regions 6a, 6b, 6c of the SiPM 10A are considered, which are each in a different size and located at a different portion, and to each of which the same number of photons enter. The photon receiving region 6a covers the entire area of the SiPM 10A, the photon receiving region 6b covers a fourth of the area of the SiPM 10A, and the photon receiving region 6c is located at a central portion of the SiPM 10A. FIG. 8 shows a histogram of output signals from the SiPM 10A. The lateral axis of the histogram shown in FIG. 8 indicates the number of APD cells 5 in which Geiger discharge occurs (which are fired), i.e., the number of photons detected, and the longitudinal axis indicates the frequency of occurrence. As can be understood from FIG. 8, although the condition on the number of photons entering each region of the SiPM 10A is the same, the histogram of the output signals shows as if the number of photons differs in each region. This is caused from such reasons that the number of APD cells 5 in each photon receiving region changes, and the proportion of photons received during the dead time increases due to the increased photon density.

Figure 9:
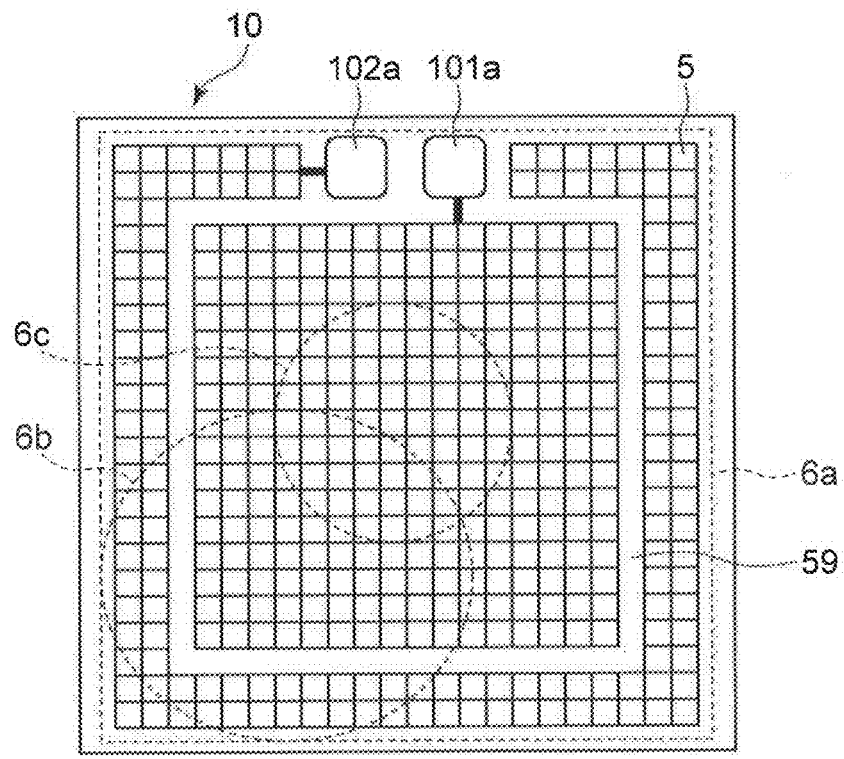
FIG. 9 is a plan view of the SiPM for explaining the photodetector according to the first embodiment.
Figure 10:
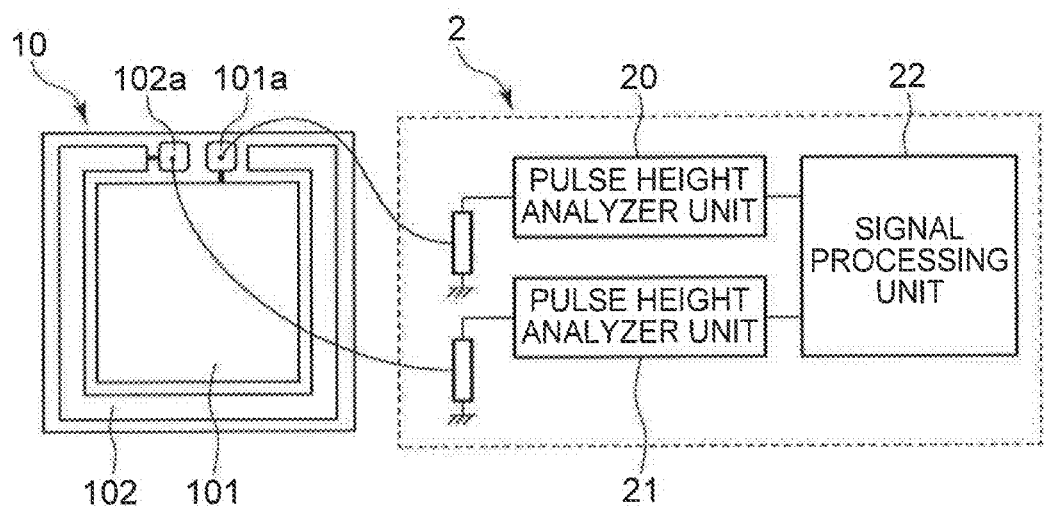
FIG. 10 is a diagram for explaining the configuration of the photodetector according to the first embodiment.
Figure 11:
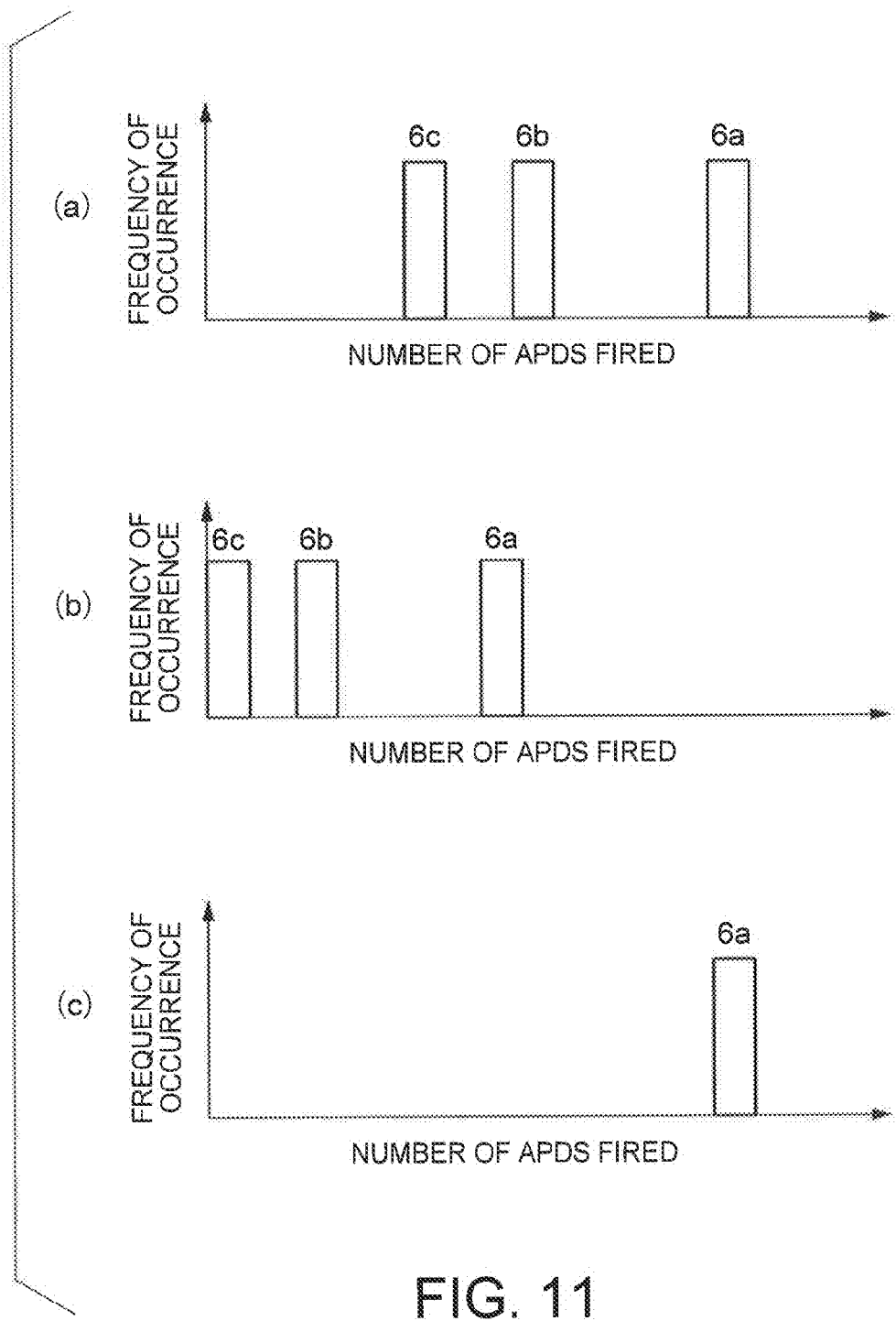
FIGS. 11(a) to 11(c) are histograms showing outputs from the pulse height analyzer units and the signal processing unit of the photodetector according to the first embodiment.

FIG. 9 is a plan view of the SiPM 10 according to the first embodiment, for explaining the photodetector 3. The photon receiving regions 6a, 6b, 6c of the photodetector 3 according to the first embodiment shown in FIG. 9 are located at the same positions of those in the comparative example shown in FIG. 7. As shown in FIG. 10, analog electrical signals outputted from the first APD cell array 101 and the second APD cell array 102 are inputted to the pulse height analyzer unit 20 and the pulse height analyzer unit 21 of the signal processing circuit 2, respectively, converted to digital signals, and then inputted to the signal processing unit 22. The pulse height analyzer units 20, 21 each have a waveform shaping function for shaping the waveforms of input pulses, an AD conversion function for analog-to-digital converting the pulse height values of the shaped pulses, a memory function for storing the number of signals in each group classified depending on the converted values, and a pulse height analyzing function for analyzing the frequency distribution of pulse height. FIGS. 11(a), 11(b), and 11(c) show outputs of the pulse height analyzer unit 20, the pulse height analyzer unit 21, and the signal processing unit 22, respectively. The lateral axis of each of the histograms shown in FIGS. 11(a), 11(b), and 11(c) indicates the number of APD cells 5 in which Geiger discharge occurs (which are fired), i.e., the number of photons detected, and the longitudinal axis indicates the frequency of occurrence. The outputs of the pulse height analyzer units 20, 21 are values corresponding to the numbers of APD cells 5 to which photons enter. Therefore, as in the case of the SiPM 10A of the comparative example shown in FIG. 7, the number of photons detected varies in each of the photon receiving regions 6a, 6b, and 6c. Furthermore, since the number of corresponding APD cells 5 differs between the first APD cell array 101 and the second APD cell array 102, the number of detected photons differs between photon receiving regions. The signal processing unit 22 calculates the ratio between the signals of the pulse height analyzer unit 20 and the pulse height analyzer unit 21, and if the ratio is in a predetermined range (for example, ±a few percent of the ratio of the number of the APD cells 5 in the first APD cell array 101 and the number of the APD cells 5 in the second APD cell array 102 of the SiPM 10), the signal analyzed by the pulse height analyzer unit 101 is recorded, and if the ratio is beyond the predetermined range, the signal analyzed by the pulse height analyzer unit 101 is not recorded, Therefore, as shown in FIG. 11(c), the signal processing unit 22 only outputs the signal of the pulse height analyzer unit 101 in the case of the photon receiving region 6a of the SiPM 10, to which photons are uniformly incident, but does not output the signals in the cases of the photon receiving regions 6b, 6c, to which the photon are not incident uniformly.

In the comparative example, even if the number of photons to be counted is the same, each region of the SiPM 10 shows a different count value. In contrast, the photodetector 3 according to the first embodiment is capable of determining non-uniformity in area to which photons are incident, and not outputting the counted value if photons are incident in a non-uniform manner to suppress variations, thereby improving the photon counting accuracy.

Figure 12:
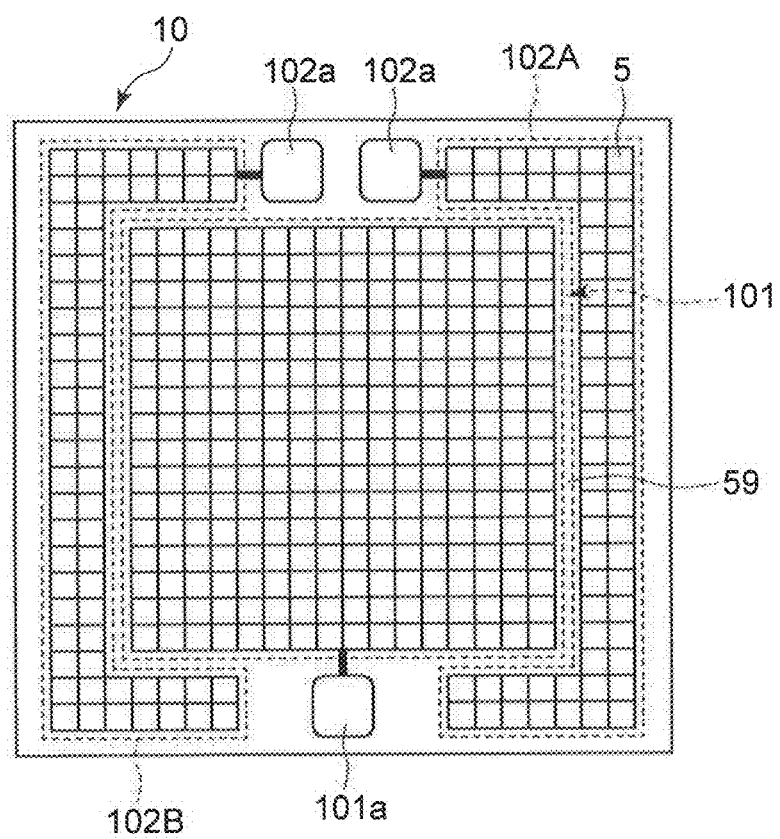
FIG. 12 is a plan view showing a second example of the SiPM included in the first embodiment.

The structure of the photodetector 3 of the first embodiment is not limited to that shown in FIG. 10, For example, the second APD cell array 102 of the SiPM 10 may be electrically divided into a plurality of second APD cell arrays 102A, 102B as shown in FIG. 12.

Figure 13:
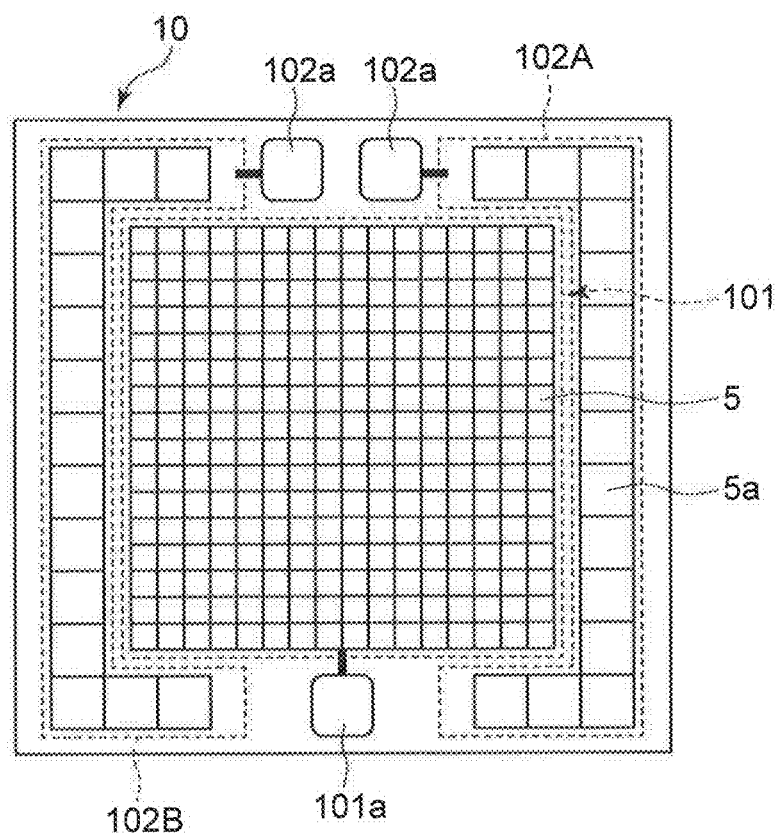
FIG. 13 is a plan view of a third example of the SiPM included in the first embodiment.

Furthermore, as shown in FIG. 13, the SiPM 10 may be formed of a first APD cell array 101 including APD cells 5 and second APD cell arrays 102A, 102B including second APD cells 5a with a cell pitch and an aperture ratio different from those of the APD cells 5. In FIGS. 2 and 12, the element isolation region 59 is present between the first APD cell array 101 and the second APD cell array(s) 102, which is considerably wider than the element isolation layer 57 between the APD cells 5.

Figure 14:
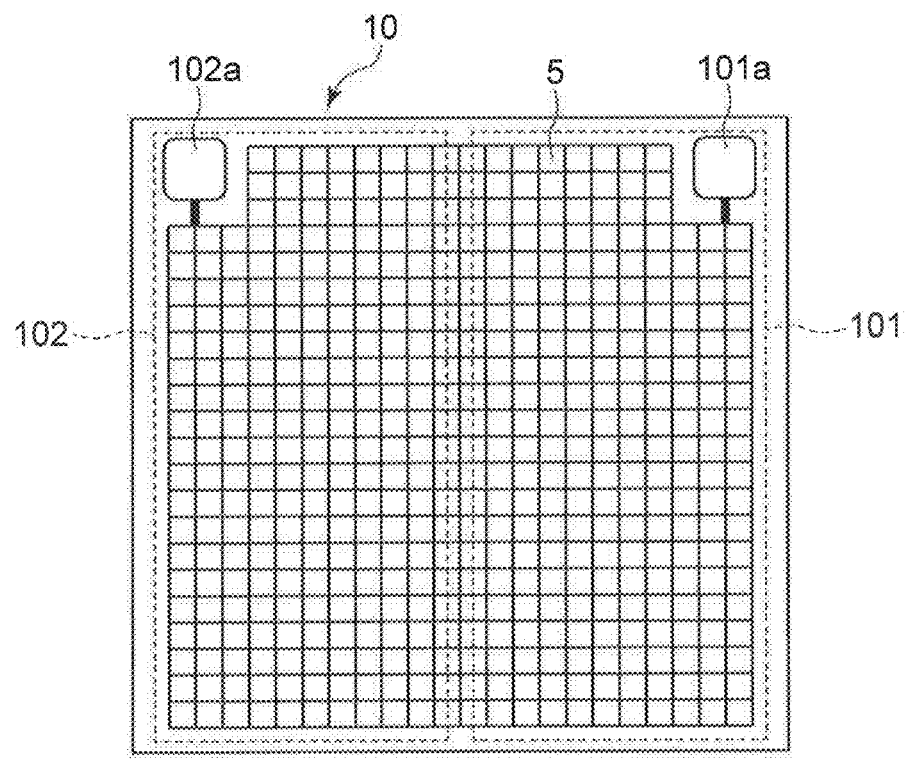
FIG. 14 is a plan view of a fourth example of the SiPM included in the first embodiment.
Figure 15:
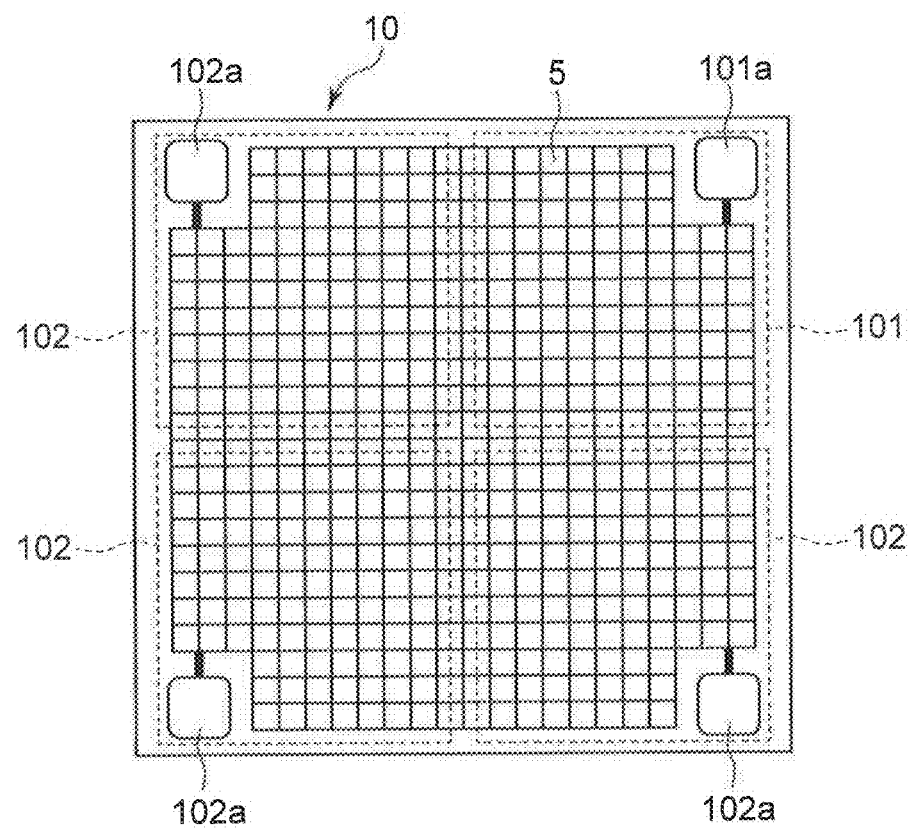
FIG. 15 is a plan view of a fifth example of the SiPM included in the first embodiment.

The APD cells 5 may be arranged in a matrix form in an array as shown in FIGS. 14 and 15, as in the SiPM 10A of the comparative example. In this case, the first APD cell array 101 and the second APD cell array 102 can be located at arbitrary positions by appropriately patterning the signal wiring line 54.

(Modification)

Figure 16:
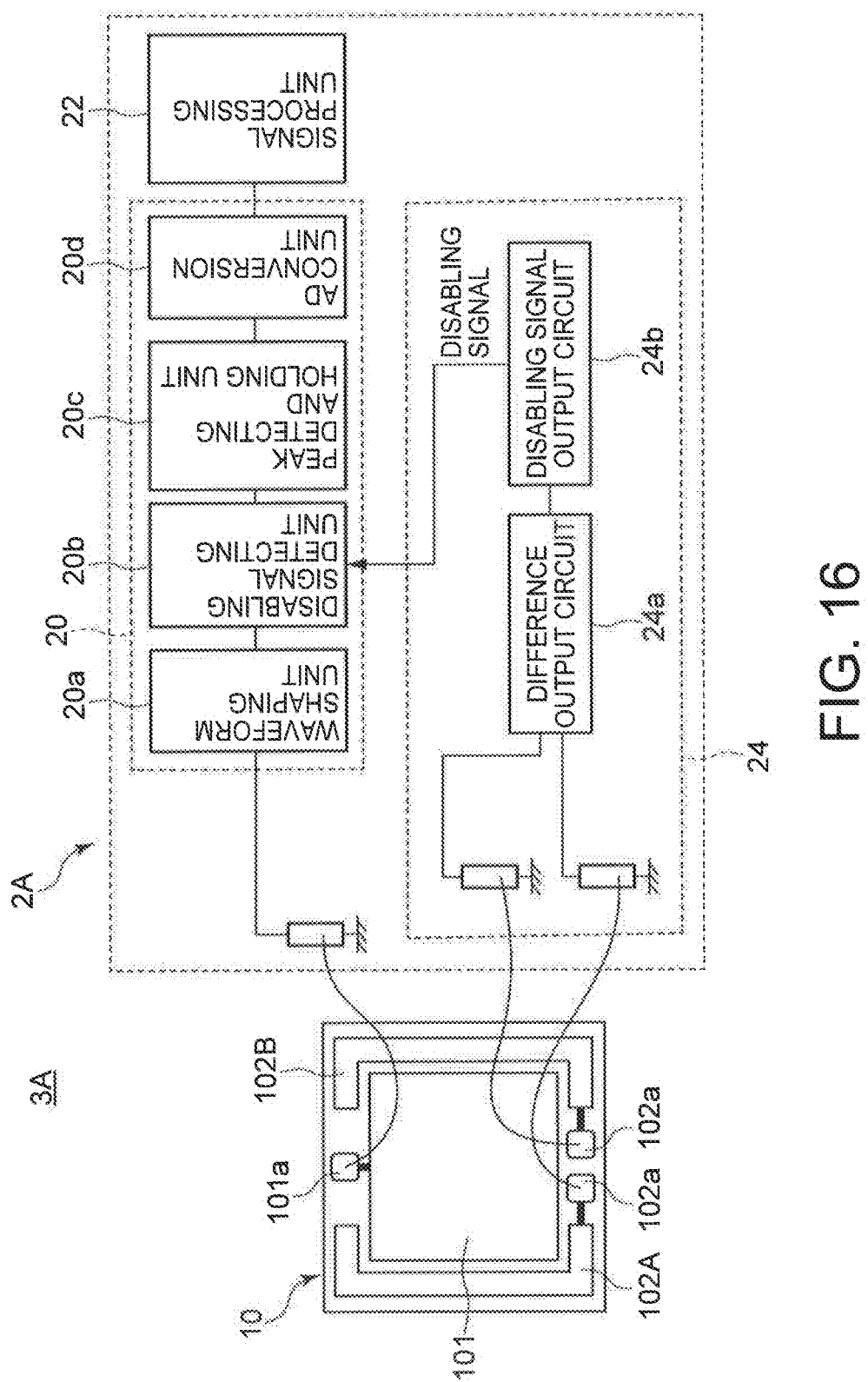
FIG. 16 is a block diagram showing a photodetector according to a modification of the first embodiment.

FIG. 16 shows a photodetector 3A according to a modification of the first embodiment. The photodetector 3A according to the modification includes the SiPM 10 shown in FIG. 12 and a signal processing circuit 2A. The signal processing circuit 2A may have a configuration depending on the number of signals to be dealt with. The signal processing circuit 2A includes a non-uniformity detecting unit 24 for detecting non-uniformity in incident photons, a pulse height analyzer unit 20, and a signal processing unit 22. The non-uniformity detecting unit 24 includes a difference output circuit 24a for outputting an absolute value of a difference between pulses outputted from the two second APD cell arrays 102, and a disabling signal output circuit 24b for outputting a disabling signal when an output signal of the difference output circuit 24a exceeds a predetermined threshold value. The pulse height analyzer unit 20 includes a waveform shaping unit 20a for shaping waveforms of pulses outputted from the first APD cell array 101, a disabling signal detecting unit 20b for not passing the output of the waveform shaping unit 20a only when a disabling signal generated by the non-uniformity detecting unit 24 is detected, a peak detecting and holding unit 20c for detecting and holding a peak of an output pulse of the waveform shaping unit 20a passing through the disabling signal detecting unit 20b, and an AD conversion unit 20d for analog-to-digital converting the output of the peak detecting and holding unit 20c.

The elements included in the signal processing circuit 2A, the non-uniformity detecting unit 24, and the pulse height analyzer unit 20 are not limited to those described above. If photons are uniformly enter the SiPM 10, the output signals of the two second APD cell arrays 102 are at the same level as shown in FIG. 17, and the output of the difference output circuit 24a becomes low.

Figure 17:
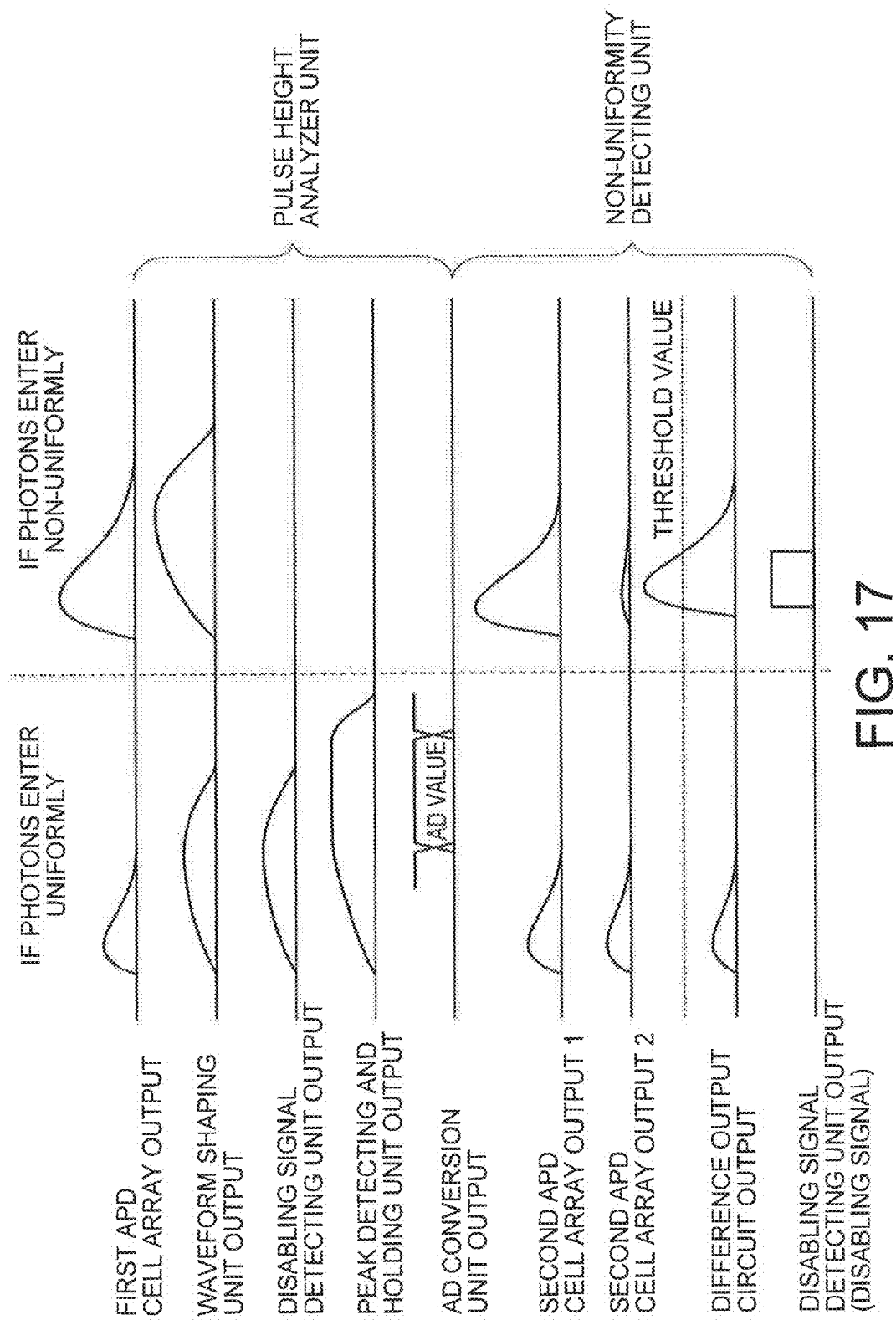
FIG. 17 is a timing chart of the signal processing circuit according to the first embodiment.

On the other hand, if photons enter non-uniformly, the output signals of the two second APD cell arrays 102 differ from each other as shown in FIG. 17, and the output of the difference output circuit 24a becomes high. If the output of the difference output circuit 24b exceeds the threshold value set by the disabling signal output circuit 24b, it is decided that photons enter non-uniformly, and a trigger pulse for generating a disabling signal is generated and outputted from the disabling signal output circuit 24b. The pulse height analyzer unit 20 does not output a signal if the disabling signal is inputted to the disabling signal detecting unit 20b. Accordingly, only when photons enter uniformly, a signal is inputted to the signal processing unit 22. Thus, the output of the signal processing unit 22, i.e., the photon counting accuracy, is improved. In this circuit configuration, the load of the signal processing unit 22 is reduced.

The process by the signal processing unit 22 can be adjusted so as not to decrease the photon counting ratio, For example, in the photodetector shown in FIG. 10, the ratio between the number of photons detected by the first APD cell array 101 and the number of photons detected by the second APD cell array 102 would change depending on where photons enter. In such a case, the digital value of the first APD cell array 101 is corrected based on digital signal values of the first APD cell array 101, the ratio between digital values of the first APD cell array 101 and digital values of the second APD cell array 102, by using a correction table including correction coefficients stored in the signal processing unit 22 in advance. In this manner, all the signals outputted from the first APD cell array 101 can be counted, and the photon counting ratio is not reduced.

As described above, the photodetector of the first embodiment is not affected by the arrangement of the APD cells 5 in the SiPM 10 and the number of output signals from the second APD cell array, and not limited by the configuration or signal processing method of the signal processing circuit. In any case, the photodetector of the first embodiment detects the distribution of photons detected by the SiPM 10, decides not to output signals that reduce the photon counting accuracy, or corrects the signals, for example, thereby improving the photon counting accuracy obtained from signals outputted finally.

(Second Embodiment)

Figure 18:
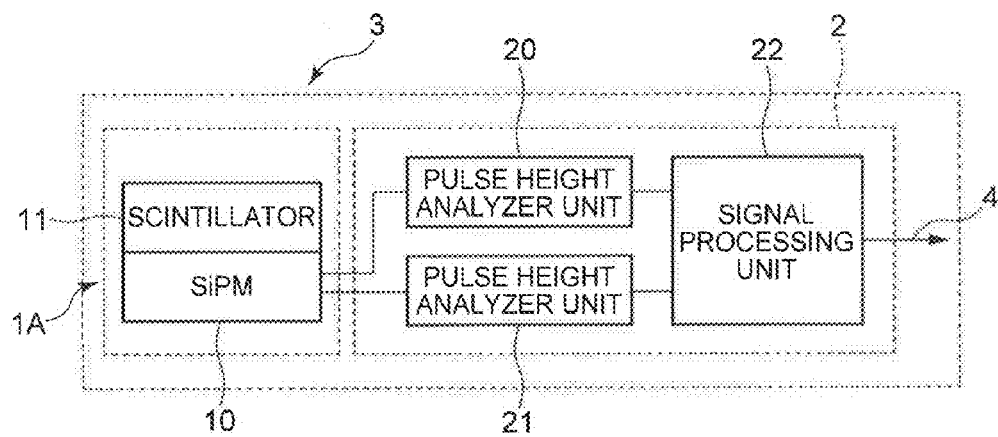
FIG. 18 is a block diagram showing a photodetector according to the second embodiment.

FIG. 18 is a block diagram showing a photodetector 3 according to the second embodiment. The photodetector 3 according to the second embodiment includes a photodetector element 1A for detecting photons to be counted and converting them to electrical signals, and a signal processing circuit 2 for processing the electrical signals photoelectrically converted by the photo-detecting element 1A. The photodetector element 1A includes a scintillator 11 for emitting fluorescent light when it receives radiation, and a SiPM 10 for detecting the fluorescent light emitted from the scintillator.

The signal processing circuit 2 includes pulse height analyzer units 20, 21 for analog-to-digital converting analog electrical signals outputted from the SiPM 10, and a signal processing unit 22 for processing digital signals outputted from the puke height analyzer units 20, 21. The output signals 4 that are analog-to-digital processed by the signal processing unit 22 are transferred to an information terminal such as a personal computer via a USB cable, for example.

Figure 19:
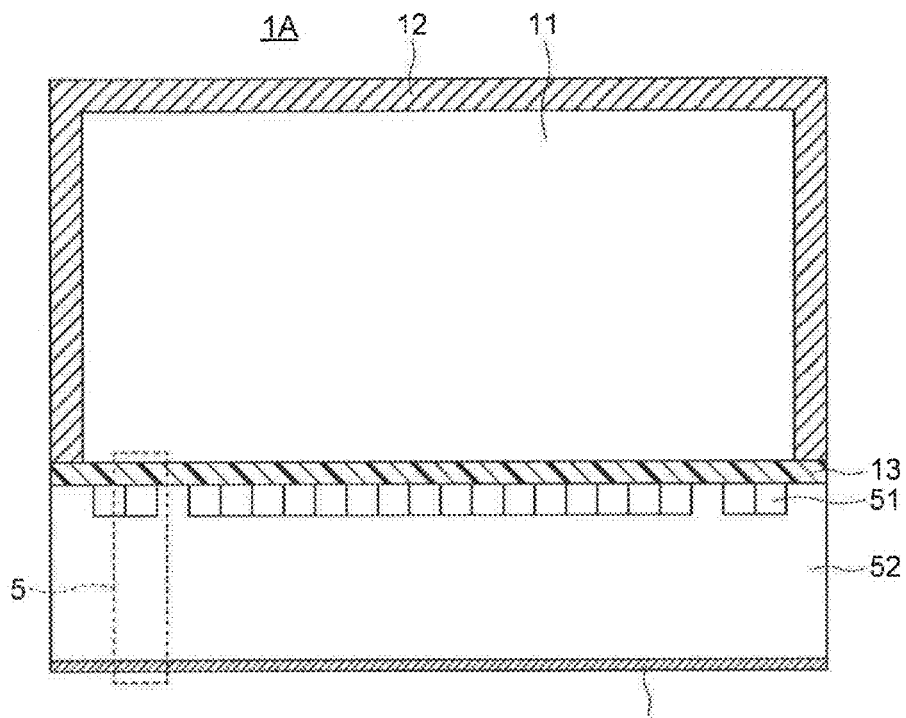
FIG. 19 is a cross-sectional view showing a photodetector element according to the second embodiment.

FIG. 19 is a cross-sectional view showing a photodetector element 1A according to the second embodiment. As in the case of the first embodiment, the photodetector element 1A according to the second embodiment includes a SiPM 10 which is formed in a semiconductor substrate 52 and in which APD cells each including an avalanche layer 51 are arranged in an array form. The SiPM 10 has the same configuration as the SiPM 10 of the first embodiment shown in FIG. 4. The photodetector element 1A of the second embodiment further includes a scintillator 11 located above the SiPM 10. The scintillator 11 and the SiPM 10 are bonded to each other by an adhesion layer 13. Five surfaces of the scintillator 11 other than the surface to be bonded to the SiPM 10 are covered by a reflector 12. Furthermore, as in the first embodiment, a metal electrode 56 is disposed on the backside of the semiconductor substrate 52.

Figure 20:
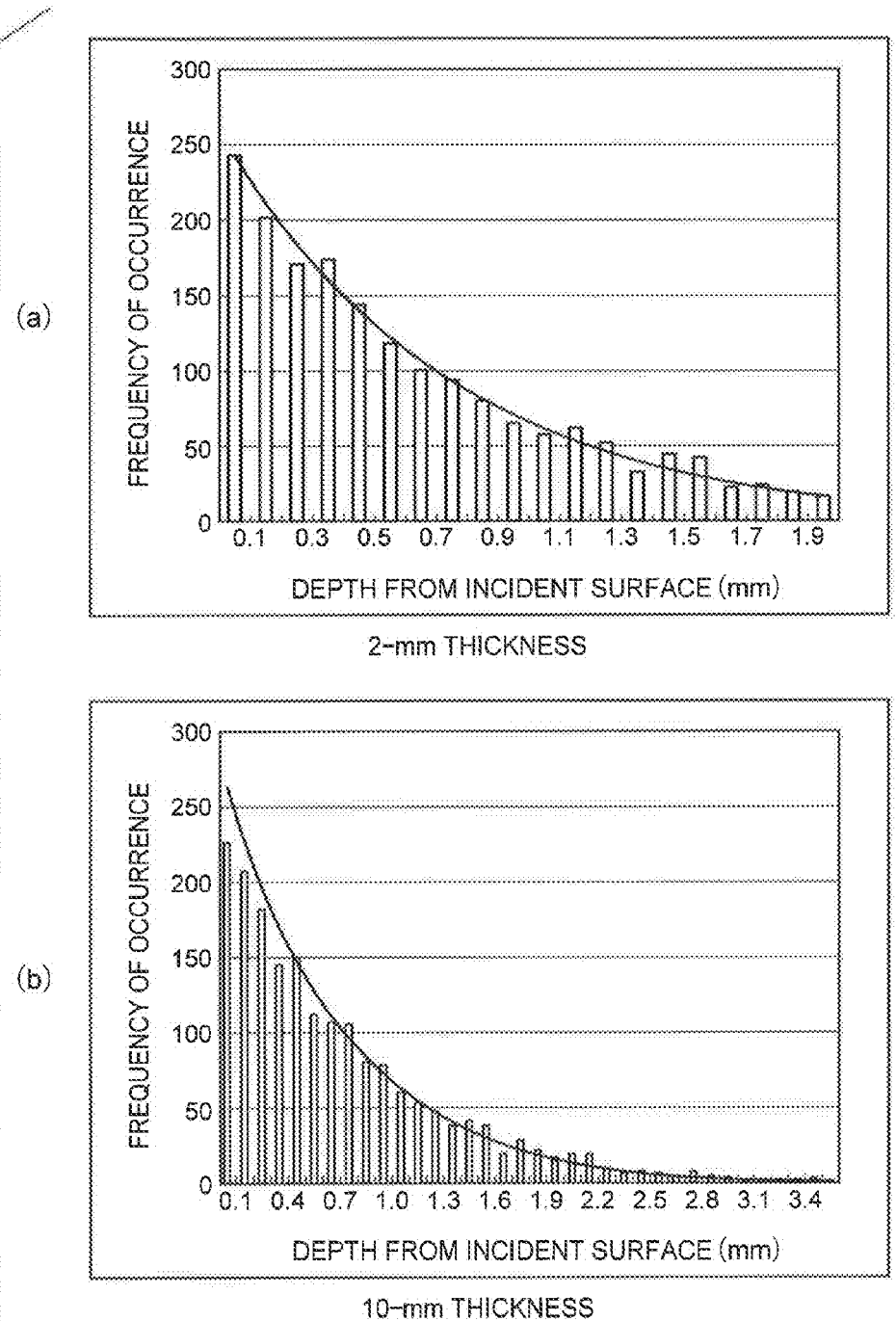
FIGS. 20(a) and 20(b) are diagrams each showing a characteristic relationship between the scintillation depth and the frequency of occurrence obtained by a simulation.

FIGS. 20(*a*) and 20(*b*) each show characteristics of the scintillation depth and the frequency of occurrence obtained from a simulation. The simulation is performed on a scintillator material, LGSO ($Lu_{2-x}Gd_xSIO_5$:Ce), having thicknesses of 10 mm and 2 mm, to which a radiation energy of 120 keV is incident.

Figure 21:
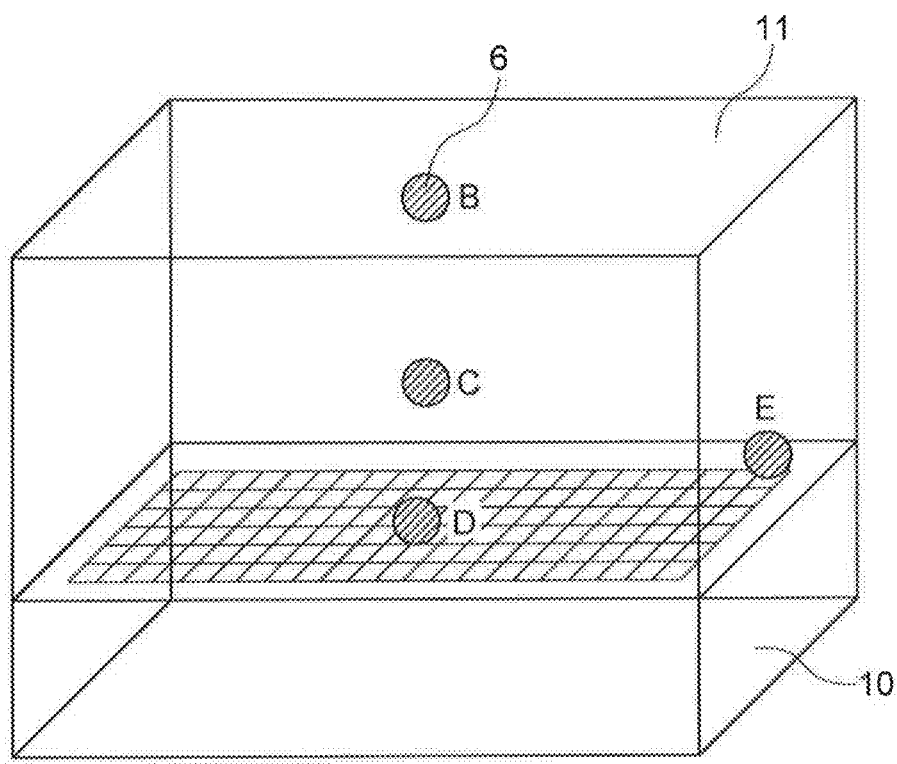
FIG. 21 is a perspective view of the photodetector element according to the second embodiment.
Figure 22:
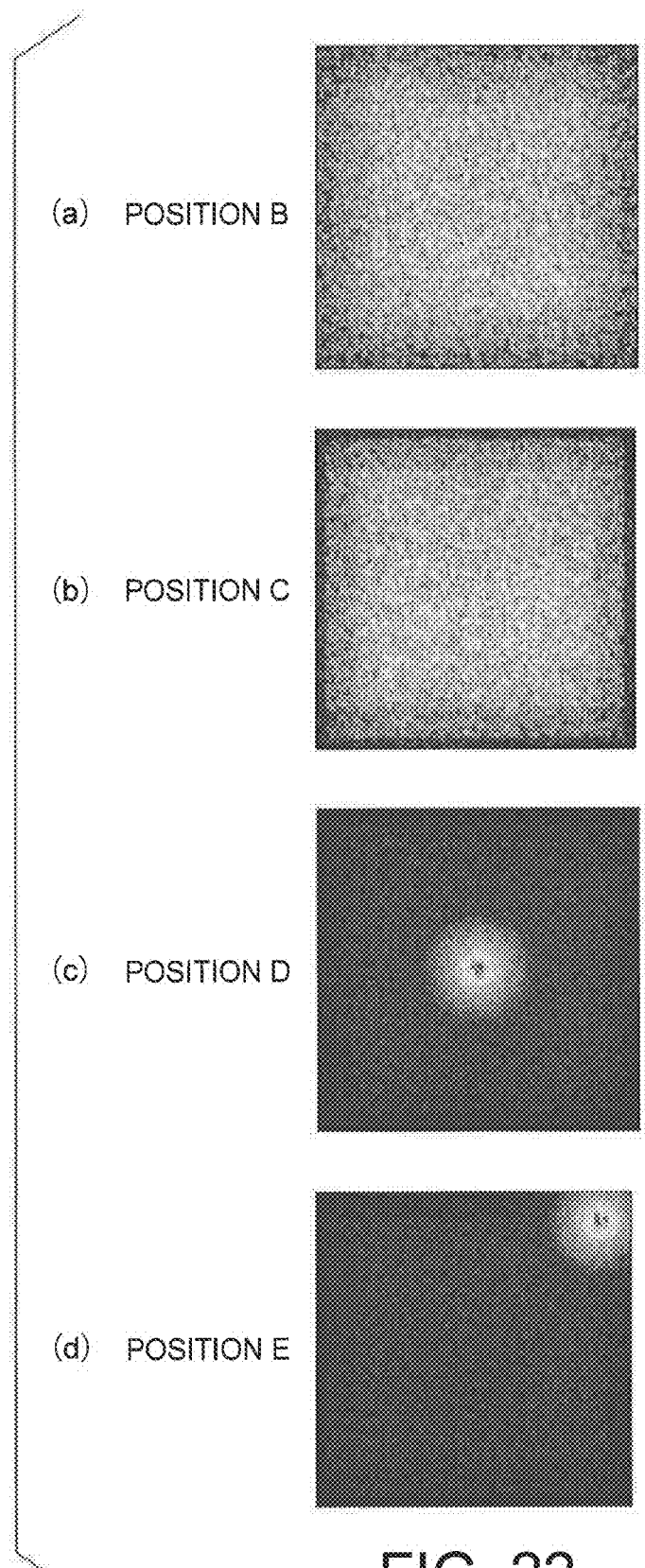
FIGS. 22(a) to 22(d) are diagrams each showing the distribution of scintillation photons reaching a SiPM, at a scintillation position.

FIG. 21 is a perspective view of the photodetector element according to the second embodiment. FIGS. 22(*a*), 22(*b*), 22(*c*), and 22(*d*) show characteristics of photon distribution at the SiPM 10 when scintillations occurs at the points B, C, D, and E in the scintillator 11, obtained by a simulation. A correlation can be found between the positions B, C, D, and E in the scintillator 11 and the photon distributions. If scintillation occurs near the incident surface of the scintillator, photons are distributed uniformly and spread over the entire region of the SiPM 10 (FIGS. 22(*a*) and 22(*b*)). In contrast, if scintillation occurs near the surface of the scintillator from which photons are emitted, photons are distributed non-uniformly (in a concentrated manner) (FIGS. 22(*c*) and 22(*d*)). As can be understood from FIGS. 20(*a*) and 20(*b*), the scintillation frequency is exponentially decayed from the surface to which the radiation enters. As a result, as the thickness of the scintillator 11 increases, the probability of the occurrence of scintillation near the photon-emitting surface decreases. Thus, the probability of the occurrence of non-uniform photon distribution can he reduced by increasing the thickness of the scintillator 11, but this would cause a new problem of increasing the costs and making the scintillator processing difficult. Furthermore, depending on the frequency and the timing of the counting, photons that are distributed non-uniformly may be counted at a ratio higher than an expected ratio, Thus, increasing the thickness could not essentially improve the counting.

On the other hand, in the photodetector 3A according to the second embodiment, the analog electrical signals outputted from the first APD cell array 101 and the second APD cell array 102 are inputted to the pulse height analyzer unit 20 and the pulse height analyzer unit 21 of the signal processing circuit 2, respectively, converted to digital signals, and inputted to the signal processing unit 22. The signal processing unit 22 obtains a ratio between signals outputted from the pulse height analyzer unit 20 and the pulse height analyzer unit 21, and if the ratio is within a predetermined range (for example, ±a few percent of the ratio between the number of APD cells 5 in the first APD cell array 101 and the number of APD cells 5 in the second APD cell array 102 in the SiPM 10), the signals analyzed by the pulse height analyzer unit 101 are recorded, and if the ratio is beyond the range, the signals analyzed by the pulse height analyzer unit 101 are not recorded. Thus, signals are outputted from the signal processing unit 22 only in the case where photons are distributed uniformly over the SiPM 10. Therefore, the photons distributed non-uniformly due to the scintillation position of the scintillator 11 do not affect the output signals.

Conventional devices provide different photon counting values depending on distributions of photons entering the SiPM 10, which is affected by where scintillation occurs in a scintillator, even if the number of photons to be counted is the same.

If the photodetector of the second embodiment is used, non-uniformity in region to which photons reach is detected, and the photon counting value in such a case is not outputted to prevent variations the counted values. In such a manner, the photon counting accuracy can be improved.

The configuration of the photodetector according to the second embodiment is not limited to that shown in FIG. 18. For example, the arrangement of the APD cells 5 in the SiPM 10, the number of output signals from the second APD cell array, the configuration of the signal processing circuit 2, and the method of processing signals may follow those shown in FIG. 16. For example, the distribution of photons detected by the SiPM 10 is obtained, and the output signals that degrade the photon counting accuracy would not be outputted. Furthermore, a correction of signals may be performed to improve the photon counting accuracy obtained from final output signals.

(Third Embodiment)

Figure 23:
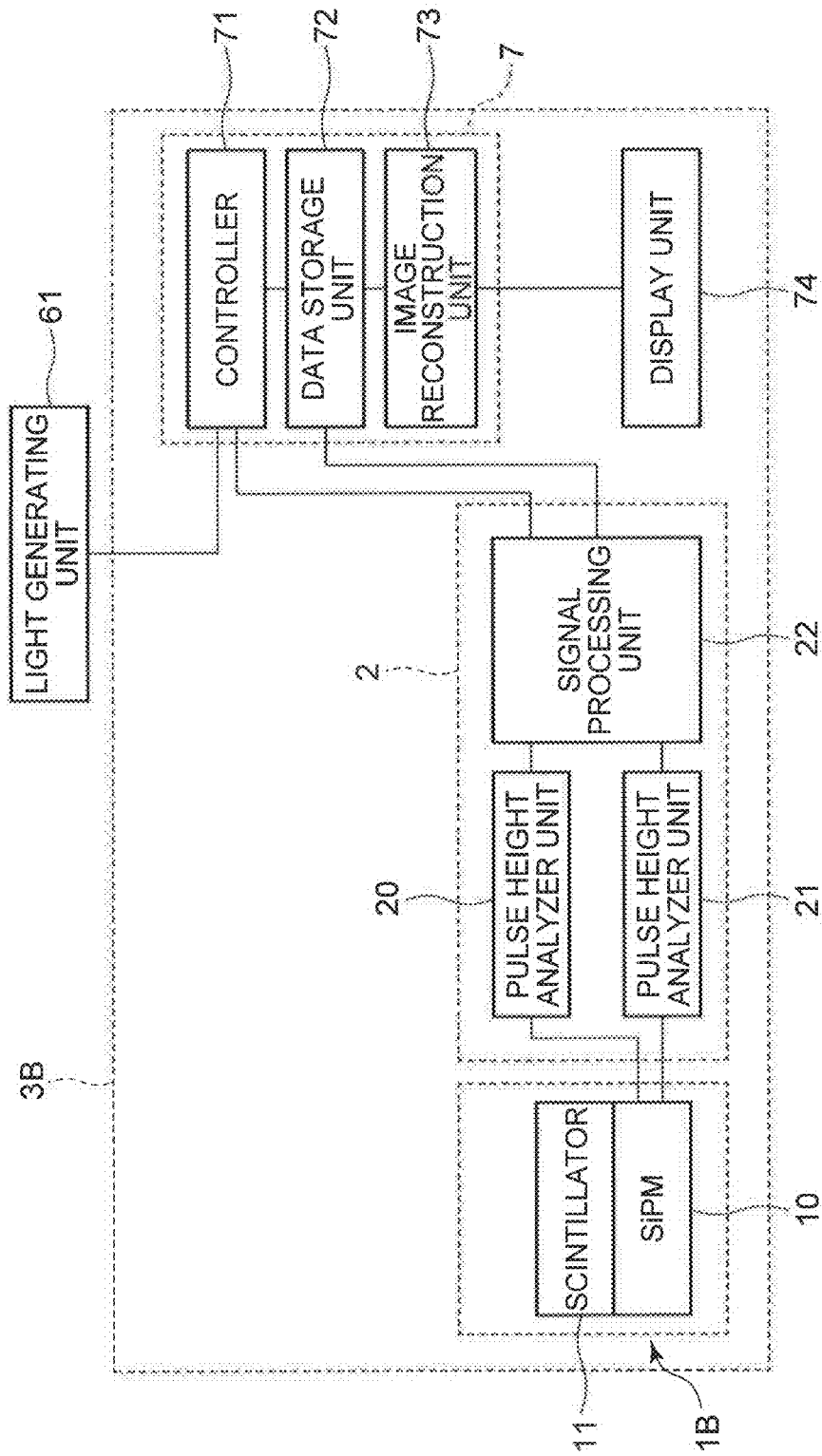
FIG. 23 is a block diagram showing a photodetector according to the third embodiment.

FIG. 23 is a block diagram showing a photodetector according to 3B according to the third embodiment. The photodetector 3B includes a light generating unit 61 for generating photons to be counted, a photodetector element 1B for detecting photons and converting them to electrical signals, a signal processing circuit 2 for processing the electrical signals photoelectrically converted by the photodetector element 1B, and a control unit 7 for analyzing the output signals from the signal processing circuit 2, and controlling the light generating unit 61 and the photodetector.

Figure 24:
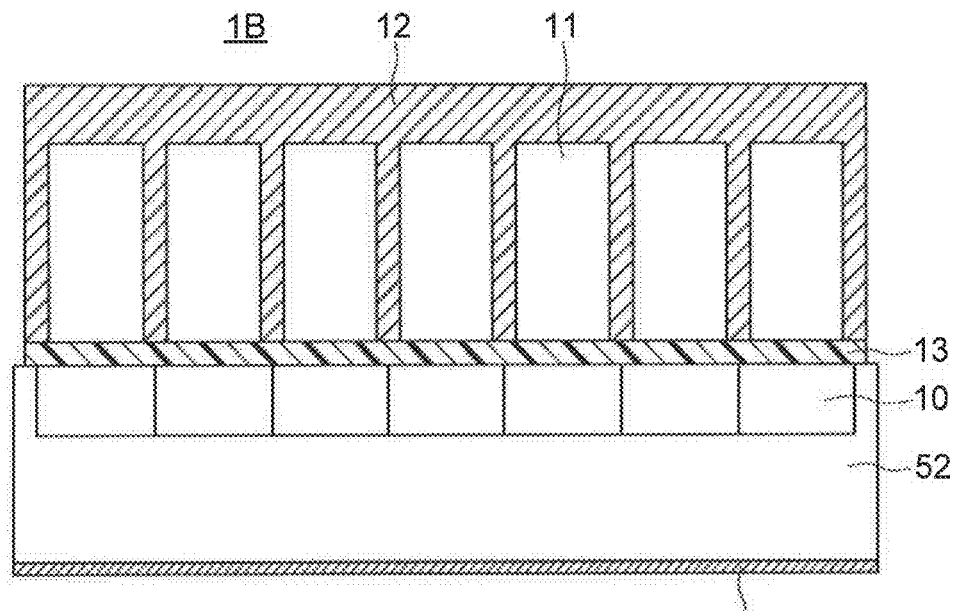
FIG. 24 is a cross-sectional view showing a photodetector element according to the third embodiment.

If the wavelength of light emitted from the light generating unit 61 is in a radiation range, the photodetector element 1B includes an array with scintillators 11 for emitting fluorescent light beams in response to radiation, and SiPMs 10 for detecting the fluorescent light beams emitted from the scintillators, as shown in FIG. 24. As in the case of the second embodiment, the SiPMs 10 are arranged in an array on a semiconductor substrate 52. Each SiPM 10 has the same configuration as the SiPM 10 according to the first embodiment shown in FIG. 4. In the third embodiment, the scintillators 11 arranged in an array are located above the SiPMs 10 arranged in an array. The scintillators 11 and the SiPMs 10 are bonded by an adhesion layer 13. Five surfaces of each scintillator 11 other than a surface to be bonded to the corresponding SiPM 10 are covered by a reflector 12. As in the case of the first embodiment, a metal electrode 56 is disposed on the backside of the semiconductor substrate 52. If light emitted from the light generating unit 61 is any of ultraviolet light, visible light and infrared light having a wavelength of 300 nm or more, the photodetector element 1B may be Formed only of the SiPMs 10.

In the photodetector 3B according to the third embodiment, the control unit 7 controls light energy and emission timing of the light generating unit 61 by means of a controller 71, and also controls the signal processing circuit 2 to be in sync with the output of the photodetector element 1B. The analog electrical signals outputted from the first APD cell array 101 and the second APD cell array 102 of each SiPM 10 are inputted to the pulse height analyzer unit 20 and the pulse height analyzer unit 21 of the signal processing circuit 2, respectively, converted to digital signals, and inputted to the signal processing unit 22. The signal processing unit 22 obtains a ratio between the signals sent from the pulse height analyzer unit 20 and the signals sent from the pulse height analyzer unit 21, and if the ratio is within a predetermined range (for example, ±a few percent of the ratio of the number of APD cells 5 of the first APD cell array 101 and the number of APD cells 5 of the second APD cell array 102 of the SiPM 10), the signals analyzed by the pulse height analyzer unit 20 are recorded, and if the ratio is beyond the predetermined range, the signals analyzed by the pulse height analyzer unit 20 are not recorded.

Figure 25:
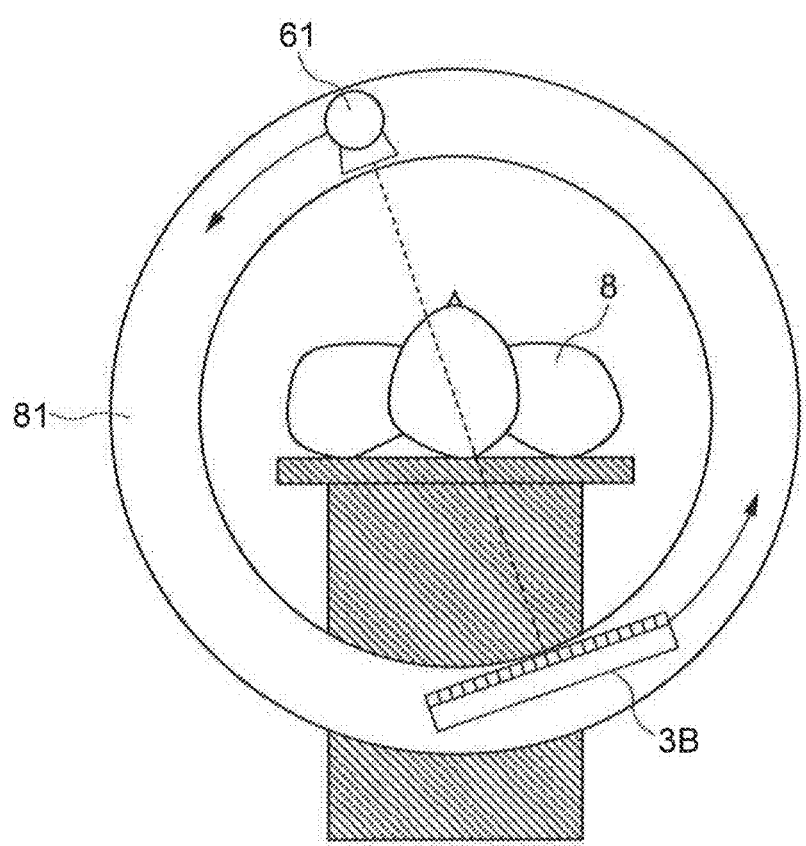
FIG. 25 is a schematic external view in a case where the photodetector according to the third embodiment is applied to a computed tomography apparatus.

Therefore, signals are outputted from the signal processing unit 22 only when photons are uniformly distributed to the SiPM 10. As a result, non-uniform distribution of photons caused by the position of scintillation in the scintillator 11 does not affect the output signals. The output signals are recorded and stored in a data storage unit 72 of the control unit 7, converted to arbitrary image data by an image reconstruction unit 73, and displayed by a display unit 74, The photodetector 3B according to the third embodiment can be applied to a computed tomography (CT) apparatus for medical imaging diagnosis. FIG. 25 shows a schematic external view of a case where the photodetector 3B according to the third embodiment is applied to a computed tomography apparatus. The light generating unit 61 and the photodetector 313 are fixed to a gantry 81 so as to be opposed to each other. Radiation emitted from the light generating unit 61 passes through the body of a person 8 and detected by the photodetector 3B. Photons of the radiation pass the body or are absorbed by substances in the body. Accordingly, an output signal histogram would show that the frequency is reduced by the amount of radiation energy absorbed by the substances in the body. By reconstructing the image, the substances in the body can be discriminated, and the positional relationship among them is clarified. If the photon counting accuracy is low, the counted value of the energy of radiation passing through the substances of the body is reduced, and the counted value of the energy of radiation absorbed by the substances of the body is increased. This would considerably affect the reconstructed image to be obtained, and there is a possibility that an existing disease may he overlooked.

In contrast, the computed tomography apparatus including the photodetector 3B according to the third embodiment does not increase the counted value of energy of radiation.

As described above, the photodetector according to the third embodiment is capable of judging non-uniformity of photons emitted from the light generating unit and reaching the SiPM, and determining not to output a count value if the non-uniformity occurs, thereby preventing variations in data, and improving the photon counting accuracy.

The configuration and the features of the photodetector according to the third embodiment are not limited to those shown in FIGS. 23 to 25.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A photodetector comprising:
a photodetector element unit including a first cell array in which a plurality of first cells are arranged in an array, each of the first cells including a photoelectric conversion element that detects a photon incident thereto and converts the photon to an electrical signal, and a second cell array in which a plurality of second cells are arranged in an array, each of the second cells including a photoelectric conversion element that detects a photon incident thereto and converts the photon to an electrical signal, the second cell array being arranged to be adjacent to the first cell array;
a first pulse height analyzer unit that analyzes a pulse height of the electrical signal outputted from the first cell array;
a second pulse height analyzer unit that analyzes a pulse height of the electrical signal outputted from the second cell array; and
a signal processing unit that determines non-uniformity of a distribution of photons entering the first cell array and the second cell array using an output signal of the first pulse height analyzer unit and an output signal of the second pulse height analyzer unit.

2. The photodetector according to claim 1, wherein the second cell array is arranged to surround the first cell array.

3. The photodetector according to claim 1, wherein the second cell array is divided into a plurality of cell arrays.

4. The photodetector according to claim 1, wherein the first cells of the first cell array differ from the second cells of the second cell array in cell pitch and aperture ratio.

5. The photodetector according to claim 1, wherein the photoelectric conversion elements of the first cells and the second cells are avalanche photodiodes.

6. The photodetector according to claim 5, wherein the avalanche photodiodes of the first cell array are connected in parallel with each other, and the avalanche photodiodes of the second cell array are connected in parallel with each other.

7. The photodetector according to claim 1, wherein the photodetector element unit further includes a scintillator that emits a fluorescent light in response to radiation, and the photoelectric conversion element converts the fluorescent light emitted from the scintillator to an electrical signal.

8. A computed tomography apparatus comprising:
the photodetector according to claim 7;
a radiation generating unit that emits radiation;
a controller that controls radiation energy from the radiation generating unit and timing to emit the radiation energy to be in sync with an output from the photodetector element unit;
a data storage unit that stores data outputted from the signal processing unit;
an image reconstruction unit that reconstructs an image based on the data stored in the data storage unit; and
a display unit that displays the image reconstructed by the image reconstruction unit.

9. A photodetector comprising:
a photodetector element unit including a first cell array in which a plurality of first cells are arranged in an array, each of the first cells including a photoelectric conversion element that detects a photon incident thereto and converts the photon to an electrical signal, a second cell array in which a plurality of second cells are arranged in an array, each of the second cells including a photoelectric conversion element that detects a photon incident thereto and converts the photon to an electrical signal, the second cell array being arranged to be adjacent to the first cell array, and a third cell array in which a plurality of third cells are arranged in an array, each of the third cells including a photoelectric conversion element that detects a photon incident thereto and converts the photon to an electrical signal, the third cell array being arranged to be adjacent to the first cell array;
a pulse height analyzer unit that analyzes the pulse height of the electrical signal outputted from the first cell array;
a non-uniformity detecting circuit that detects non-uniformity in distribution of photons incident to the first cell array and the second cell array by using the electrical signals outputted from the second cell array and the third cell array; and
a signal processing unit that processes the output signal from the first pulse height analyzer unit and the output signal from the non-uniformity detecting circuit, and outputs a result.

10. The photodetector according to claim 9, wherein the photoelectric conversion elements of the first cells, the second cells, and the third cells are avalanche photodiodes.

11. The photodetector according to claim 10, wherein the avalanche photodiodes of the first cell array are connected in parallel with each other, the avalanche photodiodes in the second cell array are connected in parallel with each other, and the avalanche photodiodes of the third cell array are connected in parallel with each other.

12. The photodetector according to claim 9, wherein the photodetector element unit further includes a scintillator that emits a fluorescent light in response to radiation, and each photoelectric conversion element converts the fluorescent light from the scintillator to an electrical signal.

13. A computed tomography apparatus comprising:
the photodetector according to claim 12;
a radiation generating unit that emits radiation;
a controller that controls radiation energy from the radiation generating unit and timing to emit the radiation energy to be in sync with an output from the photodetector element unit;
a data storage unit that stores data outputted from the signal processing unit;
an image reconstruction unit that reconstructs an image based on the data stored in the data storage unit; and
a display unit that displays the image reconstructed by the image reconstruction unit.

* * * * *